US012602489B2

(12) United States Patent
Madiraju et al.

(10) Patent No.: US 12,602,489 B2
(45) Date of Patent: Apr. 14, 2026

(54) VULNERABILITY APPLICABILITY ASSESSMENT AND DETERMINATION

(71) Applicant: International Business Machines Corporation, Armonk, NY (US)

(72) Inventors: Mrudula Madiraju, Bangalore (IN); Shyamala Gowri, Bangalore (IN); Deepashree Gandhi, Bangalore (IN); Rakhi S. Arora, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 18/582,094

(22) Filed: Feb. 20, 2024

(65) Prior Publication Data

US 2025/0265350 A1     Aug. 21, 2025

(51) Int. Cl.
G06F 21/57          (2013.01)
(52) U.S. Cl.
CPC ...... G06F 21/577 (2013.01); *G06F 2221/033* (2013.01)
(58) Field of Classification Search
CPC .......................... G06F 21/577; G06F 2221/033
See application file for complete search history.

(56) References Cited

U.S. PATENT DOCUMENTS 10,691,808 B2     6/2020  Brucker et al.
11,514,171 B2 *  11/2022  Dinh ...................... G06N 5/022

12,395,513 B2 *   8/2025  Ellsworth ............... H04L 63/20
12,443,510 B2 *  10/2025  Chan ...................... G06F 21/577
2020/0117807 A1   4/2020  Nadgowda et al.
2023/0336579 A1  10/2023  Ellsworth
2025/0225014 A1 * 7/2025  Raszka ............... G06F 11/3604

FOREIGN PATENT DOCUMENTS

CN          117094002 A     11/2023
IN       202311062250 A     10/2023

OTHER PUBLICATIONS

Github, "Bump github.com/emicklei/go-restful/v3 from versionv3. 9.0 to v3.10.0," github.com, Aug. 9, 2023, 5 pages, accessed Feb. 7, 2024, https://github.com/kubernetes/kubernetes/issues/119854.
Github, "bump github.com/emicklei/go-restful/v3 to v3.11.0," github. com, Sep. 28, 2023, 11 pages, accessed Feb. 20, 2024, https://github. com/kubernetes/kubernetes/pull/119865.

* cited by examiner

*Primary Examiner* — Pramila Parthasarathy
(74) *Attorney, Agent, or Firm* — Yee & Associates, P.C.

(57)          ABSTRACT

A computer implemented method processes vulnerabilities. A processor set identifies a vulnerability and a description of the vulnerability in a vulnerability report. The processor set extracts a set of key exploit conditions for the vulnerability from the description of the vulnerability. The processor set generates a set of different code snippets for the set of key exploit conditions. The processor set searches a set of repositories for a match between the set of components and the set of different code snippets to form a search result. The processor set identifies vulnerability assessment information relating to an applicability of the vulnerability in response to the match between the set of components and the set of different code snippets in the search result.

20 Claims, 8 Drawing Sheets

COMPUTING ENVIRONMENT
100

500 ~

~600

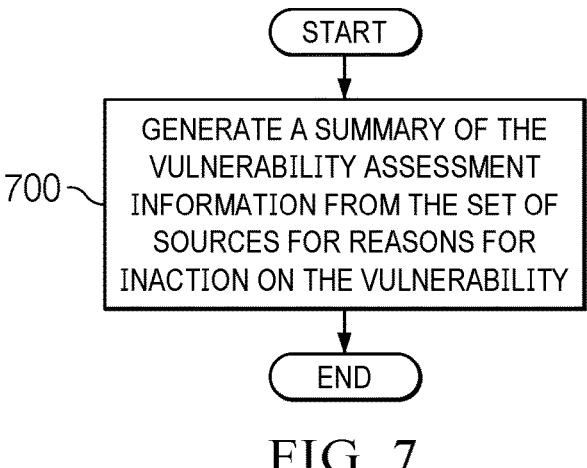

START

700 — GENERATE A SUMMARY OF THE VULNERABILITY ASSESSMENT INFORMATION FROM THE SET OF SOURCES FOR REASONS FOR INACTION ON THE VULNERABILITY

END

FIG. 7

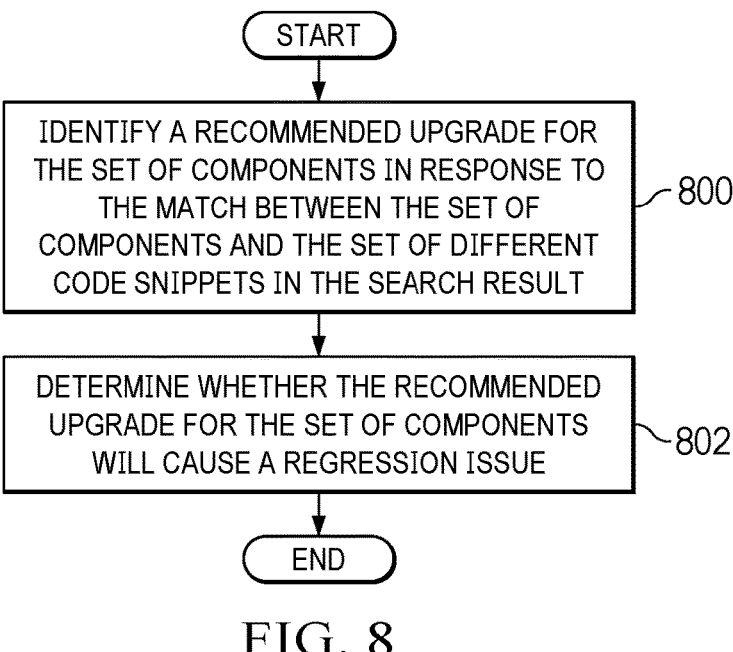

START

IDENTIFY A RECOMMENDED UPGRADE FOR THE SET OF COMPONENTS IN RESPONSE TO THE MATCH BETWEEN THE SET OF COMPONENTS AND THE SET OF DIFFERENT CODE SNIPPETS IN THE SEARCH RESULT — 800

DETERMINE WHETHER THE RECOMMENDED UPGRADE FOR THE SET OF COMPONENTS WILL CAUSE A REGRESSION ISSUE — 802

END

FIG. 8

START

900 — INPUT A SET OF KEY EXPLOIT CONDITIONS, A SET OF CODE CONSTRUCTS, AND A SET OF PROGRAMMING LANGUAGES TO A MACHINE LEARNING MODEL SYSTEM

902 — RECEIVE THE SET OF DIFFERENT CODE SNIPPETS FOR THE SET OF KEY EXPLOIT CONDITIONS, A SET OF CODE CONSTRUCTS IN THE SET OF PROGRAMMING LANGUAGES FROM THE MACHINE LEARNING MODEL SYSTEM

END

VULNERABILITY APPLICABILITY ASSESSMENT AND DETERMINATION

BACKGROUND

The disclosure relates generally to an improved computer system and more specifically to assessing and identifying vulnerabilities in program code.

In managing a service on a cloud or shipping code to customers, product teams and service teams run vulnerability scans on the code to identify vulnerabilities or weaknesses in the program code. The scans can be performed using various cybersecurity platforms. The scans can include Twistlock Container Scans, Aquasec scans, Source Code Scans, Github Repo (Mend) Scans, Dynamic web scans, and other scans from other cybersecurity platforms. Customers that receive program codes, such as docker images, may run their own scans and track vulnerabilities.

Common vulnerabilities and exposures (CVE) reports are vulnerability reports that can be generated for docker images and containers. These reports can show hundreds or thousands of common vulnerabilities and exposures depending on open source and other third-party dependencies for particular software projects. These common vulnerabilities and exposures can be responded to by upgrading the versions of dependencies such as software libraries, frameworks, or other components that a particular application uses.

SUMMARY

According to one illustrative embodiment, a computer implemented method processes vulnerabilities. A processor set identifies a vulnerability and a description of the vulnerability in a vulnerability report. The processor set extracts a set of key exploit conditions for the vulnerability from the description of the vulnerability. The processor set generates a set of different code snippets for the set of key exploit conditions. The processor set searches a set of repositories for a match between the set of components and the set of different code snippets to form a search result. The processor set identifies vulnerability assessment information relating to an applicability of the vulnerability in response to the match between the set of components and the set of different code snippets in the search result. According to other illustrative embodiments, a computer system and a computer program product for processing vulnerabilities are provided.

BRIEF DESCRIPTION OF THE DRAWINGS

FIG. 7 is a flowchart of a process for identifying vulnerability assessment information in accordance with an illustrative embodiment;

FIG. 8 is a flowchart of a process for upgrading the component in accordance with an illustrative embodiment;

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
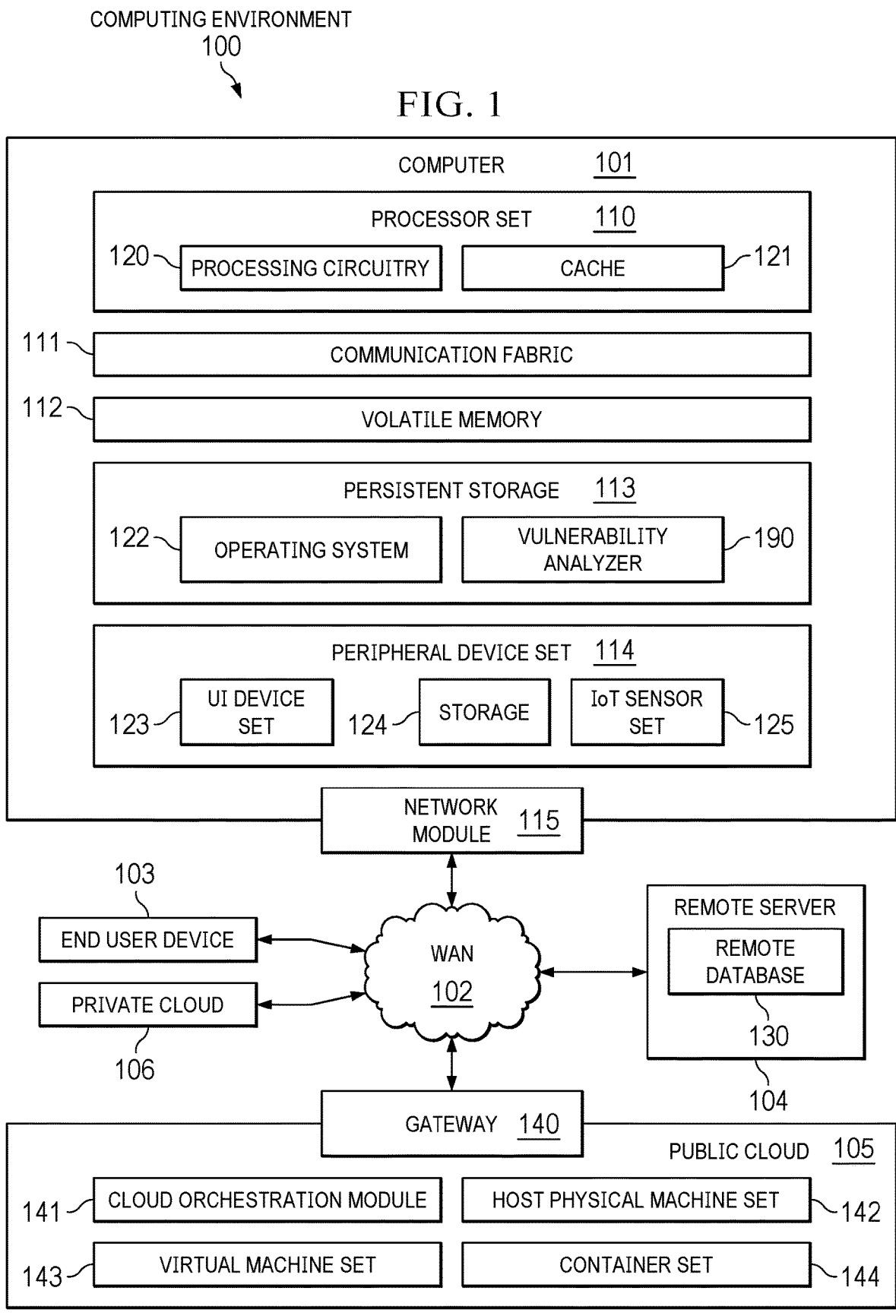
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as vulnerability analyzer 190. In addition to vulnerability analyzer 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and vulnerability analyzer 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a component program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in vulnerability analyzer 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in vulnerability analyzer 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. A typical response to a vulnerability in a vulnerability report is to upgrade the version of the component having a vulnerability. For example, a library, a method, a package, or other component is upgraded. Further, other components of dependencies are also upgraded. This process can include regression testing, creating new images, deploying new images, and other steps.

However, not all vulnerabilities can be fixed or resolved. For example with open source software, the source software community may determine that a vulnerability is a false positive or not applicable. As a result, a patch, workaround, upgrade, or other fix may be unavailable.

With these situations, an assessment and determination of the applicability of each tolerability is performed. This assessment involves a person reviewing the text describing the vulnerability. A manual determination is made by the person as to whether the particular use of library or package matches the conditions for exploiting the vulnerability. Many times, this analysis requires an understanding of the code base and understanding how the source code of the organization invokes and interacts with these packages. With multiple languages, multiple source code repositories (both internal and external) are involved. This process can become a time consuming and challenging task and is left to the understanding of the person performing the assessment.

Once the vulnerability has been assessed, the person determines whether the vulnerability is applicable. The severity level may be changed depending on the results of the assessment. For example, a framework may be identified as having a critical vulnerability in vulnerability reports. Upgrading a framework with a major version change may involve large amounts of effort. This effort can include breaking interfaces, rewriting code, testing, and other steps. The vulnerability may only be exploitable depending on the particular implementation of the framework. The report of the vulnerability can be reviewed and the usage of the framework analyzed to determine what action to take.

For example, if the key exploit condition involves using a proxy user mechanism, an analysis can be made as to how the framework is implemented. If the framework uses a standard system defined user identifier, then the key exploit condition is not present. As a result, an upgrade may be unnecessary.

Analyzing hundreds or thousands of vulnerabilities in a report is a time-consuming and labor-intensive process. Thus, it is desirable to have a more efficient process for processing vulnerabilities identified in vulnerability reports.

Thus, the illustrative embodiments provide a computer implemented method, apparatus, computer system, and computer program product for processing vulnerabilities. In one illustrative example, a computer implemented method operates to process vulnerabilities. A vulnerability and a description of the vulnerability are identified in a vulnerability report. A set of key exploit conditions is extracted for the vulnerability from the description of the vulnerability. A set of different code snippets is generated for the set of key exploit conditions. A set of repositories are searched for program code matching the set of different code snippets to form a search result. A presence of a match means that the number of key exploit conditions is present in the implementation of the program code. Vulnerability assessment information relating to an applicability of the vulnerability is identified.

As used herein, "a set of" when used with reference to items, means one or more items. For example, "a key exploit conditions" is one or more key exploit conditions.

Additionally, information about vulnerabilities including previous assessments of vulnerabilities can be searched for in various sources in response to detecting the vulnerability in the repository. These sources can be a repository, a forum, database, or other source of vulnerability assessment information. Summaries of the vulnerability assessment information can be generated from sources in the illustrative examples.

Figure 2:
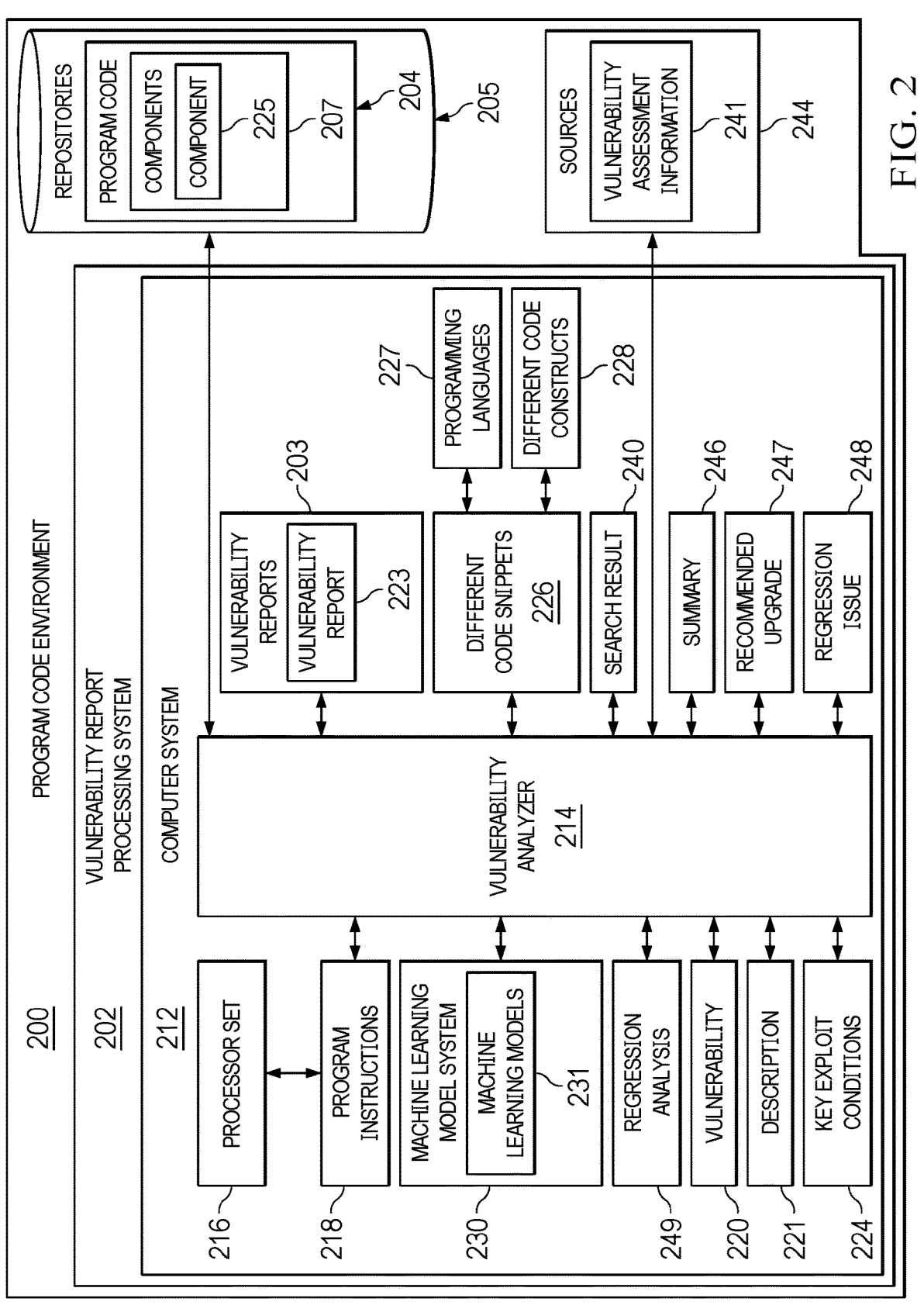
FIG. 2 is a block diagram of a program code environment in accordance with an illustrative embodiment.

With reference now to FIG. 2, a block diagram of a program code environment is depicted in accordance with an illustrative embodiment. In this illustrative example, program code environment 200 includes components that can be implemented in hardware such as the hardware shown in computing environment 100 in FIG. 1. In this example, vulnerability report processing system 202 can operate to process vulnerability reports 203 generated for program code 204 in a set of repositories 205.

A repository is a location where a storage system can store program code 204. In addition, the repository can also hold other artifacts related to software about including source code, binary files, containing images, and packages. In this example, program code 204 is in the form of source code. As another example, program code 204 can take other forms including binary files, executable files, packages, or other forms.

The set of repositories 205 can provide a version control and organize environments where programmers, developers, or other people can collaborate, manage, and track changes to components 207 in program code 204.

In this illustrative example, components 207 are individual software elements that make up a software system. The software system can be, for example, an operating system, a web browser, an office suite, a database management system, or other types of software systems. Components 207 can include, for example, a library, a package, a method, a module, a function, an interface, a class, a command, a constructor, and other types of components.

As depicted, vulnerability report processing system 202 comprises computer system 212 and vulnerability analyzer 214. Vulnerability analyzer 214 is located in computer system 212. Vulnerability analyzer 214 may be implemented using vulnerability analyzer 190 in FIG. 1.

In this illustrative example, vulnerability analyzer 214 can be implemented in software, hardware, firmware, or a combination thereof. When software is used, the operations performed by vulnerability analyzer 214 can be implemented in program instructions configured to run on hardware, such as a processor unit. When firmware is used, the operations performed by vulnerability analyzer 214 can be implemented in program instructions and data and stored in persistent memory to run on a processor unit. When hardware is employed, the hardware can include circuits that operate to perform the operations in vulnerability analyzer 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes processor set 216 that is capable of executing program instructions 218 implementing processes in the illustrative examples. In other words, program instructions 218 are computer-readable program instructions. Processor set 216 is an example of processor set 110 in FIG. 1.

As used herein, a processor unit in processor set 216 is a hardware device and is comprised of hardware circuits such as those on an integrated circuit that respond to and process instructions and program code that operate a computer. Processor set 216 can be a number of processor units unit can be implemented using processor set 110 in FIG. 1. The processor units can also be referred to as computer processors. When processor set 216 executes program instructions 218 for a process, processor set 216 can be one or more processor units that are in the same computer or in different computers. In other words, the process can be distributed between processor units in processor set 216 on the same or different computers in computer system 212.

Further, processor set 216 can include the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

Although not shown, processor set 216 can also include other components in addition to the processor units or processing circuitry. For example, processor set 216 can also include a cache or other components used with processor units or other processing circuitry.

In this illustrative example, vulnerability analyzer 214 identifies vulnerability 220 and description 221 of vulnerability 220 in vulnerability report 223. Vulnerability report 223 can be a report in a set of vulnerability reports 203 generated for program code 204 in the set of repositories 205. In this example, program code 204 is source code and program code 204 and is code for components 207. In another example, program code 204 takes a form such as binary files, by code, or other forms. In this example, vulnerability 220 is identified for component 225 in components 207 from vulnerability report 223.

Vulnerability analyzer 214 extracts a set of key exploit conditions 224 for vulnerability 220 from description 221 of vulnerability 220 in vulnerability report 223. In the illustrative example, the set of key exploit conditions 224 is one or more circumstances or conditions under which vulnerability 220 for component 225 can be exploited or used to compromise component 225.

Further, vulnerability analyzer 214 generates a set of different code snippets 226 for the set of key exploit conditions 224. In this example, the set of different code snippets 226 can be present for different languages and code constructs.

For example, the set of different code snippets 226 can be for different programming languages 227. A code snippet can be present for each language that may be expected to be used in program code 204. As another example, the set of different code snippets 226 have different code constructs 228 that are different methodologies to invoke component 225. Each code snippet in the set of different code snippets 226 for a particular language can be for a particular manner in which component 225 can be invoked.

In this illustrative example, different code constructs 228 represent different ways for invoking component 225. For example, a component for overwriting or setting configurations can be invoked using different code constructs. These code constructs can be for example, a function, constructor, a method invocation to a library, instantiation of the class, or other types of code constructs for invoking the component. In the different illustrative examples, a vulnerability may be applicable to a component only when a particular code construct is used while the vulnerability is not applicable when other code constructs are used. The particular code construct that is applicable can be described or defined in the set of key exploit conditions 224.

In this illustrative example, the set of different code snippets can be generated using machine learning model system 230. In this example, machine learning model system 230 comprises a number of machine learning models 231. A machine learning model is a type of artificial intelligence model that can learn without being explicitly programmed. A machine learning model can learn using training data input into the machine learning model. The training data can also be referred to as a training dataset.

The machine learning model can learn using various types of machine learning algorithms. The machine learning algorithms include at least one of a supervised learning, an unsupervised learning, a feature learning, a sparse dictionary learning, an anomaly detection, a reinforcement learning, a recommendation learning, or other types of learning algorithms. Examples of machine learning models include an artificial neural network, a convolutional neural network, a generative adversarial network (GAN), a sequence to sequence model, a variation auto encoder, a decision tree, a support vector machine, a regression machine learning model, a classification machine learning model, a random forest learning model, a Bayesian network, a genetic algorithm, and other types of models. These machine learning models can be trained using data and process additional data after training to provide a desired output.

When multiple machine learning models are present, one or more of these machine learning models can be trained to generate the set of different code snippets 226. In generating the set of different code snippets 226, machine learning models 231 can be implemented using at least one of a neural network, a generative adversarial network (GAN), a sequence to sequence model, a variation auto encoder, or other types of machine learning models suitable for generating program code.

For example, vulnerability analyzer 214 can generate the set of different code snippets by inputting the set of key exploit conditions 224, a set of different code constructs 228, and a set of programming languages 227 to machine learning model system 230. In response, vulnerability analyzer 214 receives the set of different code snippets 226 for the set of key exploit conditions 224 of the set of different code constructs 228 in set of programming languages 227 from machine learning model system 230.

In this example, a code snippet in the set of different code snippets 226 can be generated by machine learning model system 230 for each code construct that can be present for a key exploit condition in a programming language. For example, if a key exploit condition is present and program code 204 is in two programming languages, a code snippet for the key exploit condition is generated for each code construct in the first programming language. In a similar fashion, a code snippet for the key exploit condition is generated for each construct in the second programming language.

Vulnerability analyzer 214 searches the set of repositories 205 for a match between a set of components 207 and the set of different code snippets 226 to form search result 240. In this example, vulnerability analyzer 214 can search the set of repositories 205 using a currently available component such as a static code analyzer. This type of analyzer can search repositories 205 for occurrences of the set of different code snippets 226.

The search can be for an exact match for one that is within some tolerance. In other words, this static code analyzer can analyze different languages across different styles and variations of different code snippets 226. When the static code analyzer is capable of searching across different languages, the set of different code snippets 226 do not need to be in different languages.

In this example, more than one component can be present in components 207 that match the set of different code snippets 226. For example, one component may be in the first programming language while the second component is a second programming language that both match the set of different code snippets 226.

Vulnerability analyzer 214 identifies vulnerability assessment information 241 relating to an applicability of vulnerability 220 in response to the match between the set of components 207 and the set of different code snippets 226 in search result 240. Vulnerability assessment information 241 can be identified by searching a set of sources 244 for vulnerability assessment information 241 related to the applicability of vulnerability 220 in response to the search result indicating that vulnerability 220 has been detected for set of components 207 in the set of repositories 205. The set of sources 244 can be selected from at least one of a repository, a forum, a database, a wiki, a website, or other type of source of information about vulnerabilities.

In this illustrative example, vulnerability assessment information 241 relating to vulnerability 220 is information about whether vulnerability 220 is applicable to any of components 207 matching the set of different code snippets 226. This probability assessment information can include at least one of a comment, a best practice, a patch, a release note, information about why an action may not be needed for vulnerability 220, or information about how vulnerability 220 may be applicable to a particular component in components 207.

Additionally, vulnerability analyzer 214 can determine the applicability of vulnerability 220 based on search result 240 and vulnerability assessment information 241. In another illustrative example, vulnerability analyzer 214 can generate summary 246 of vulnerability assessment information 241 from the set of sources 244 for reasons for inaction on vulnerability 220. This process can parse through this amount of information in vulnerability assessment information 241 to identify information indicating why vulnerability 220 is inapplicable for a particular situation such that no action may be needed. This information can be analyzed to determine whether any actions are needed with respect to vulnerability 220 located for a set of components 207 in the set of repositories 205.

Further, vulnerability analyzer 214 can identify recommended upgrade 247 for the set of components 207 in response to the match between the set of components 207 and the set of different code snippets 226 in search result 240. Vulnerability analyzer 214 can also determine whether recommended upgrade 247 for the set of components 207 will cause a regression issue 248. In other words, vulnerability analyzer 214 can determine whether recommended upgrade 247 for vulnerability 220 will cause any issues in the operation of the set of components 207 or other components that were with the set of components 207. This determination can be made by vulnerability analyzer 214 analyzer and vulnerability assessment information 241. These issues may be, for example, incompatibilities or mismatches in the source code and test cases. This determination can be performed using regression analysis 249. This analysis can be performed using a machine learning model trained to identify regression issues.

Computer system 212 can be configured to perform at least one of the steps, operations, or actions described in the different illustrative examples using software, hardware, firmware, or a combination thereof. As a result, computer system 212 operates as a special purpose computer system in which vulnerability analyzer 214 in computer system 212 enables processing vulnerabilities identified in vulnerability reports 203. In particular, vulnerability analyzer 214 transforms computer system 212 into a special purpose computer system as compared to currently available general computer systems that do not have vulnerability analyzer 214.

In the illustrative example, the use of vulnerability analyzer 214 in computer system 212 integrates processes into a practical application for method processing vulnerabilities that may be identified in vulnerability reports. The different steps performed in the process can be made to identify actions to be performed on program code 204 though a practical application of vulnerability report processing system 202. The actions can include forming upgrade, final patch, removing the component, taking no action. These actions can include at least one or more of components 207, or other suitable actions.

The illustration of program code environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the description of vulnerability analyzer 214 can process one or more vulnerabilities in addition to vulnerability 220. Vulnerability analyzer 214 can process each vulnerability identified in vulnerability report 223. Further, vulnerability analyzer 214 can process the other vulnerability reports in vulnerability reports 203 in the same manner. Further, vulnerability report processing system 202 can be used by other organizations in addition to a developer. For example, vulnerability report processing system 202 can be used by a client or customer. This system can be implemented in computer system 212 for the client or customer. In other illustrative examples, vulnerability report processing system 202 can be a service accessed by the user which can be a developer, a client, a customer, or other user.

Figure 3:
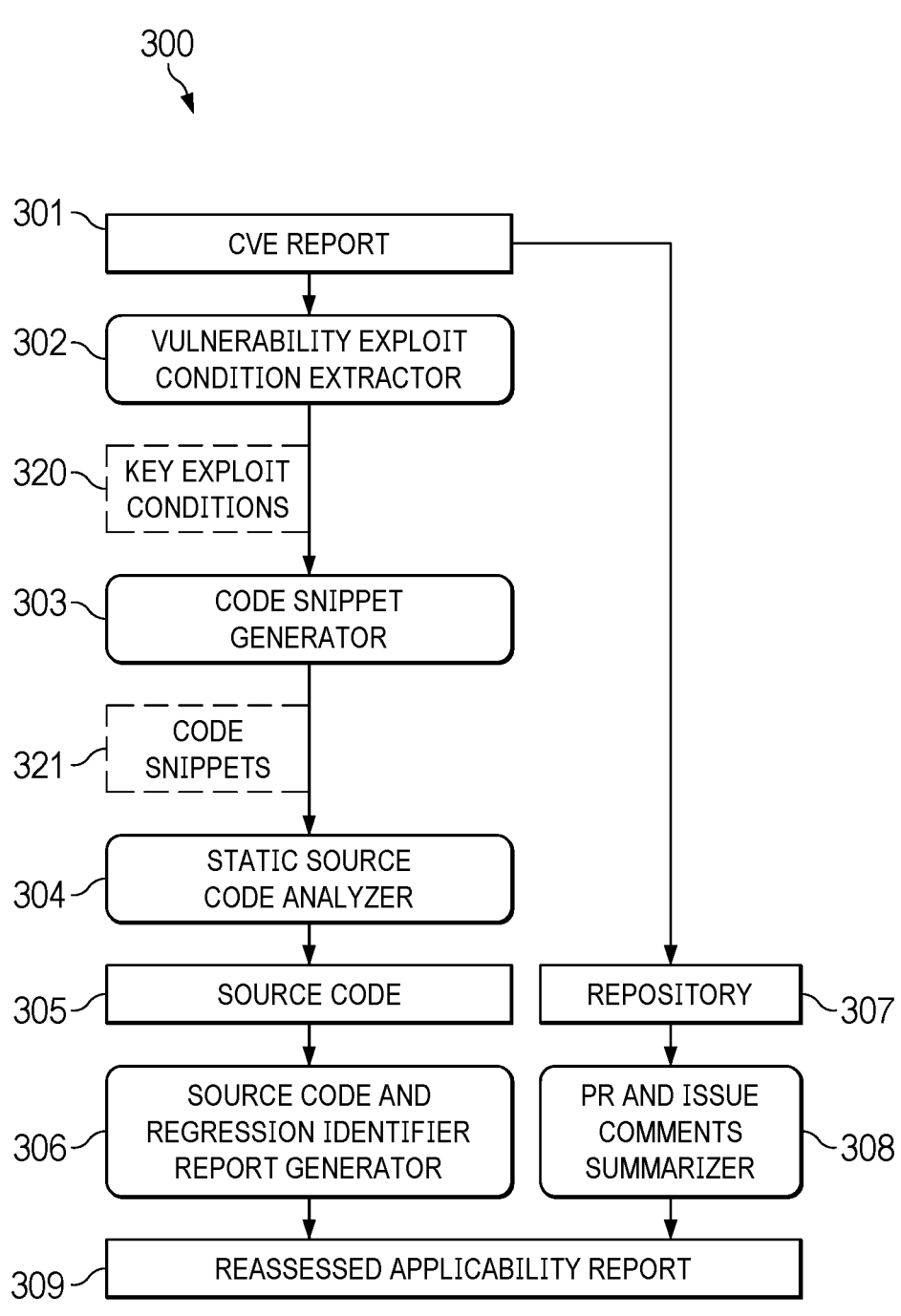
FIG. 3 is a dataflow diagram illustrating the processing of vulnerabilities in accordance with an illustrative embodiment.

With reference next to FIG. 3, a dataflow diagram illustrating the processing of vulnerabilities is depicted in accordance with an illustrative embodiment. In this illustrative example, vulnerability report processing 300 is a data flow that can be implemented in vulnerability report processing system 202 in FIG. 2. The different steps in this data flow can be performed by vulnerability analyzer 214 in vulnerability report processing system 202 in FIG. 2.

As depicted, common vulnerabilities and exposure (CVE) report 301 is an example of vulnerability report 223. In this example, CVE report 301 is comprised of text and can be in a comma-separated values (CSV) format. This report CVE contains an identification of one or more vulnerabilities and a description of the vulnerabilities.

Vulnerability exploit condition extractor 302 extracts a set of key exploit conditions 320 for one or more components from CVE report 301. Each vulnerability identified can have one or more key exploit conditions.

In this example, vulnerability exploit condition extractor 302 can be implemented using a text summarization and key condition extraction module. This component can be implemented using one or more machine learning models. In this example, one or more large language models (LLMs) can be used.

For example, the text description in CVE report 301 can include a pattern information delineated by commas using a CSV format. This pattern can be for example, package name ("Jackson", "werkzeug", "libcurl"); vulnerable version ("2.15.2", "2.3.0"); trigger agent ("attackers", "malicious user"); vulnerability manifestation ("send arbitrarily large requests", "thereby trick the application to use the file based cert instead of the one referred to by name"); vulnerability category ("denial of service", "DOS", "Buffer Overflow"); and trigger condition ("specially crafted url", "OAUTH2 authenticated tokens", "untrusted code").

In this example, this text is processed by vulnerability exploit condition extractor 302 to extract a set of key exploit conditions 320. Other text can be discarded or used at a later time. This text can be descriptive text or references to environment variables, functions, or configuration parameters.

Next, code snippet generator 303 generates a set of code snippets 321 from the set of key exploit conditions 320 received from vulnerability exploit condition extractor 302. In this example, code snippet generator 303 can be implemented using one or more machine learning models that are able to take text and generate code snippets in different styles and languages. For example, this component can use generative machine learning models that employ natural language processing. In this illustrative example, the input to a machine learning model includes the set of key exploit conditions. In some cases, the input can also include programming languages for the code snippets. In other examples, the machine learning models can automatically generate code snippets in selected programming languages. Further, the set of code snippets 321 are code for different code constructs used to invoke the component for which the vulnerability has been identified.

Code snippets 321 are used by static source code analyzer 304 to search for matches in source code 305. In this example, source code 305 can be located in files in a repository. Source code 305 may contain code for the component for which the vulnerability has been identified.

In this example, static source code analyzer 304 looks at the given source code repository and checks for the occurrences of these above key exploit code condition patterns in the actual source code files. These conditions are identified by determining whether matches are present to code snippets 321, which are generated from key exploit conditions 320.

In this illustrative example, static source code analyzer 304 can be implemented using currently available static code analyzers and can analyze different languages across the different styles and variations of code snippets 321. Further, static source code analyzer 304 can be selected to analyze variations in different source code formats.

In response to identifying components matching the code snippets, source code and regression identifier report generator 306 will look at the recommended upgrade version for a given component and determine whether the upgrade will cause incompatibilities or interface mismatches in the source code and test cases. This determination can be made by analyzing at the source code and release notes of the package in question. In one illustrative example, source code and regression identifier report generator 306 can be implemented by a machine learning model or other type of program capable of analyzing source code 305 for a component and determining whether upgrades will cause regression issues between the component and other components that interface with the component directly or indirectly in a software system or application. Presence of a regression machine means that the components or the entire system may have unexpected behaviors or errors.

Additionally, CVE report 301 can be used by patch release (PR) and issue comments summarizer 308 to search repository 307 for information about patch releases and issues regarding vulnerabilities. In this example, this repository is for a web-based platform containing services, tools, and information for software developers and teams. One example of a platform is GitHub. In some cases, communities do not contribute or commit to a fix due to either regressions it can create, or they consider the vulnerability as not applicable. These lengthy discussions can be found in sources such as repository 307.

In this example, PR and issue comment summarizer 308 can search repository 307 to identify reasons for inaction on a vulnerability. For example, PR and issue comment summarizer 308 can be implemented using a machine learning model that is trained to parse through comments to generate at text summarization and identify the reasoning for a vulnerability inaction.

In this illustrative example, source code and regression identifier report generator 306 and PR and issue comment summarizer 308 generate information for reassessed applicability report 309. This report can contain, for each of the vulnerabilities identified, information such as an indication as to whether a key exploit condition was found in source code 305. If the key exploit condition is found, a link to source code 305 that may need changes is provided. A common vulnerability and exploit (CVE) linkage analysis may be included. For example, the Go CVEs that exist in kubectl binary is also occurring in the helm binary.

If the key exploit condition is not found, then the severity of the vulnerability can be changed. For example, the severity level of the vulnerability can be changed from critical to low.

Figure 4:
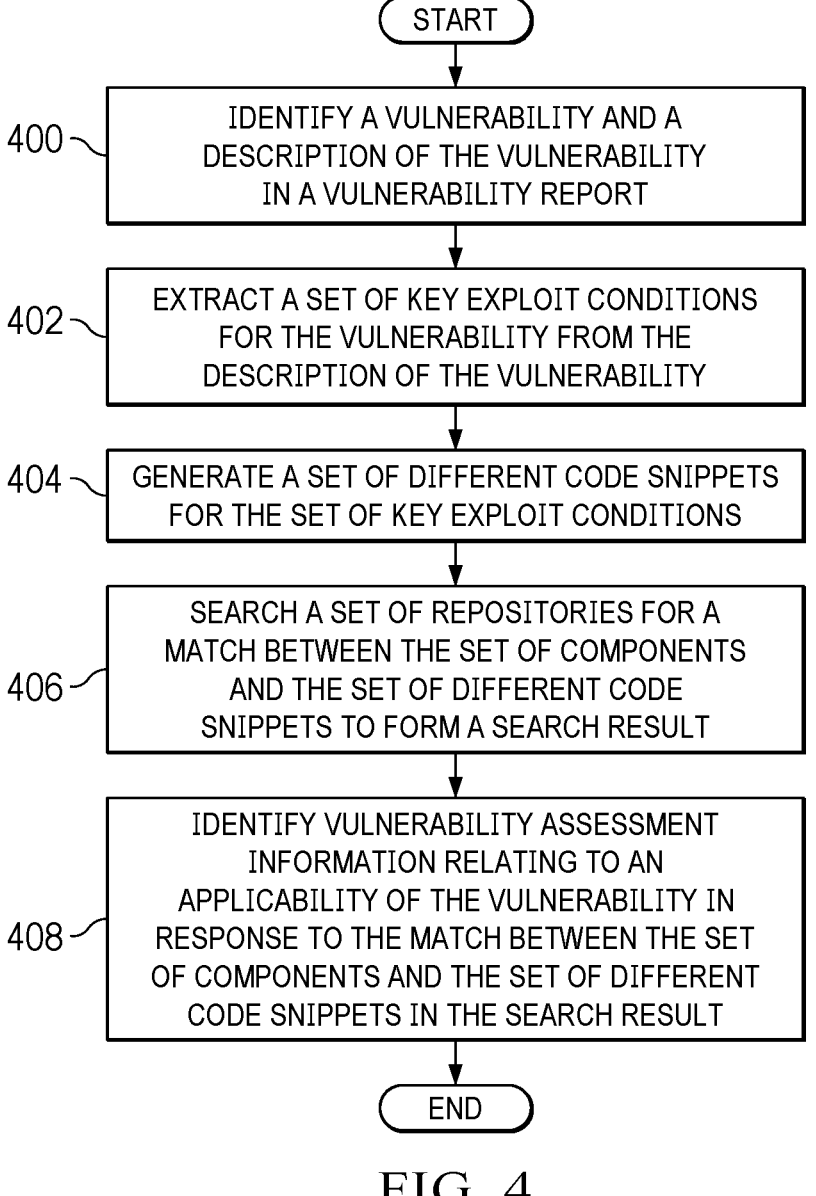
FIG. 4 is a flowchart of a process for processing vulnerabilities in accordance with an illustrative embodiment.

Turning next to FIG. 4, a flowchart of a process for processing vulnerabilities is depicted in accordance with an illustrative embodiment. The process in FIG. 4 can be implemented in hardware, software, or both. When implemented in software, the process can take the form of program instructions that are run by a processor set located in one or more hardware devices in one or more computer systems. For example, the process can be implemented in vulnerability analyzer 214 in computer system 212 in FIG. 2.

The process identifies a vulnerability and a description of the vulnerability in a vulnerability report (step 400). The process extracts a set of key exploit conditions for the vulnerability from the description of the vulnerability (step 402).

The process generates a set of different code snippets for the set of key exploit conditions (step 404). The process searches a set of repositories for a match between the set of components and the set of different code snippets to form a search result (step 406). In step 406, the search can be made in a repository such as repository 307 in FIG. 3.

The process identifies vulnerability assessment information relating to an applicability of the vulnerability in response to the match between the set of components and the set of different code snippets in the search result (step 408). The process terminates thereafter. In step 408, this search result can be used to generate reports such as reassessed applicability report 309 in FIG. 3.

Figure 5:
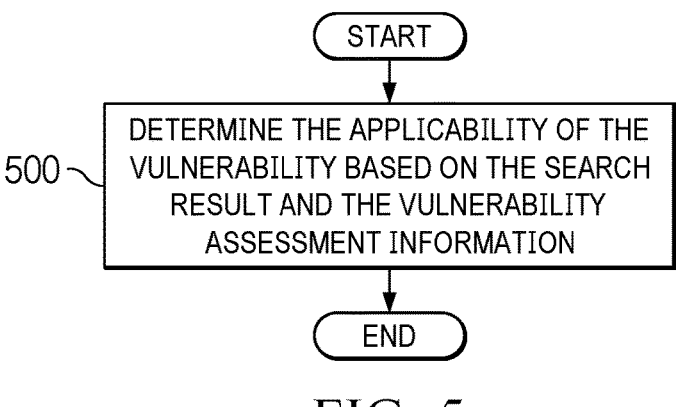
FIG. 5 is a flowchart of a process for determining the applicability of a vulnerability in accordance with an illustrative embodiment.

Turning now to FIG. 5, a flowchart of a process for determining the applicability of a vulnerability is depicted in accordance with an illustrative embodiment. The process in this figure is an example of an additional step that can be performed with steps in FIG. 4.

The process determines the applicability of the vulnerability based on the search result and the vulnerability assessment information (step 500). The process terminates thereafter.

Figure 6:
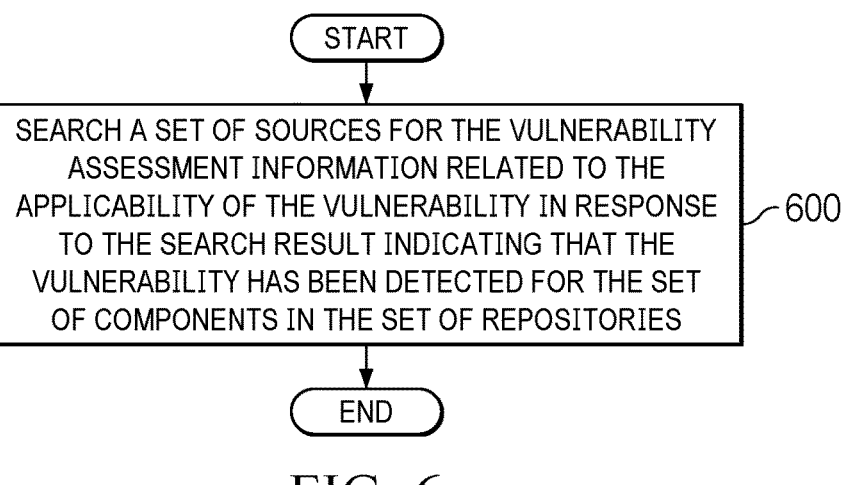
FIG. 6 is a flowchart of a process for identifying vulnerability assessment information in accordance with an illustrative embodiment.

Next in FIG. 6, a flowchart of a process for identifying vulnerability assessment information is depicted in accordance with an illustrative embodiment. The process in this flowchart is an example of an implementation for step 408 in FIG. 4.

The process searches a set of sources for the vulnerability assessment information related to the applicability of the vulnerability in response to the search result indicating that the vulnerability has been detected for the set of components in the set of repositories (operation 600). In one illustrative example, the search can be performed in a repository for software developers. The process terminates thereafter.

With reference now to FIG. 7, a flowchart of a process for identifying vulnerability assessment information is depicted in accordance with an illustrative embodiment. The process in this flowchart is an example of another step that can be performed with step 600 in FIG. 6 as part of implementing step 408 in FIG. 4.

The process generates a summary of the vulnerability assessment information from the set of sources for reasons for inaction on the vulnerability (step 700). The process terminates thereafter. In generating the summary in step 700, a severity reassessment can be included to reduce the severity when the reasons for inaction are present for the vulnerability. For example, the vulnerability may not be applicable to the components identified with the vulnerability because the key exploit conditions are absent or even though the key exploit conditions are present, the vulnerability is still not of concern.

Next in FIG. 8, a flowchart of a process for upgrading the component is depicted in accordance with an illustrative embodiment. The process in this flowchart is an example of additional steps that can form with the process in FIG. 4.

The process begins by identifying a recommended upgrade for the set of components in response to the match between the set of components and the set of different code snippets in the search result (step 800). In step 800, the recommended upgrade can be determined from a number of different sources. For example, the vulnerability report may recommend an upgrade. In other illustrative examples, sources such as forums for developers, vulnerability repositories, and other sources may recommend upgrades that can be made.

The process determines whether the recommended upgrade for the set of components will cause a regression issue (step 802). The process terminates thereafter. In step 802, the determination of whether a regression is present can be determined by a regression analysis. This analysis can involve inspecting the interfacing code between two modules. For example, interfacing can be present if the organization source code repository or enclosed dependency components invokes an application programming interface (API) on an open-source software (OSS) package/library using a specific method signature and parameters. And if the following vulnerability and exploit remediation suggestion is for the callee OSS package/library to be upgraded from say version 2.x to 3.x, this upgrade can be a breaking change because of a major version upgrade per semantic versioning. In this example, the regression analysis can inspect to determine whether the API that was called before the upgrade is still available with the same signature on the upgraded module. If the API is not available, a breaking change is present that causes regression. This analysis can be performed even with a minor version upgrade.

This analysis can involve identifying points in source code, unit test code, or integration test code that can potentially break with upgrading the code. Further, the analysis can include identifying runtime as well as compile time regressions.

Thus, this process can be used to determine whether an upgrade will cause incompatibilities or interface mismatches in the source code and test cases. In one illustrative example, these steps can be performed by source code and regression identifier report generator 306 in FIG. 3 to determine whether a regression issue is present.

Figure 9:
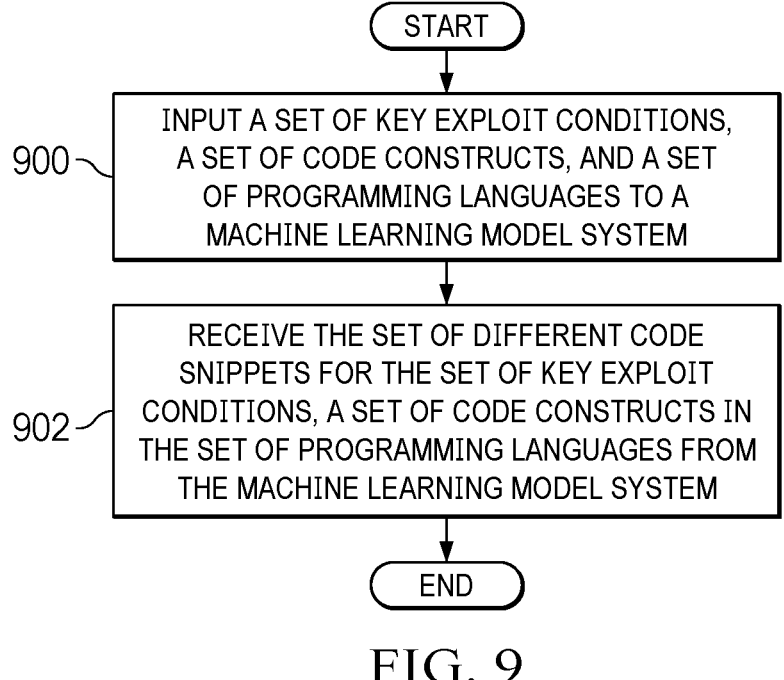
FIG. 9 is a flowchart of a process for generating a set of code snippets in accordance with an illustrative embodiment.

With reference now to FIG. 9, a flowchart of a process for generating a set of code snippets is depicted in accordance with an illustrative embodiment. The process in this flowchart is an example of an implementation for step 404 in FIG. 4. This process can be implemented using a machine learning model.

The process inputs a set of key exploit conditions, a set of code constructs, and a set of programming languages to a machine learning model system (step 900). In step 900, programming languages can be input such as, for example, C++, Java, and Rust. The code constructs can be, for example, a function, a constructor, a method invocation to a library, or instantiate a class for other constructs that can be generated to invoke the components with the vulnerability.

The process receives the set of different code snippets for the set of key exploit conditions using the set of code constructs in the set of programming languages from the machine learning model system (step 902). The process terminates thereafter.

In other illustrative examples, the set of code constructs and programming languages do not need to be used as inputs. With this example, the machine learning model can be trained to generate the code snippets for a number of different languages without selecting the languages. The machine learning model can also be trained to generate different possible constructs for a particular key exploit condition.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
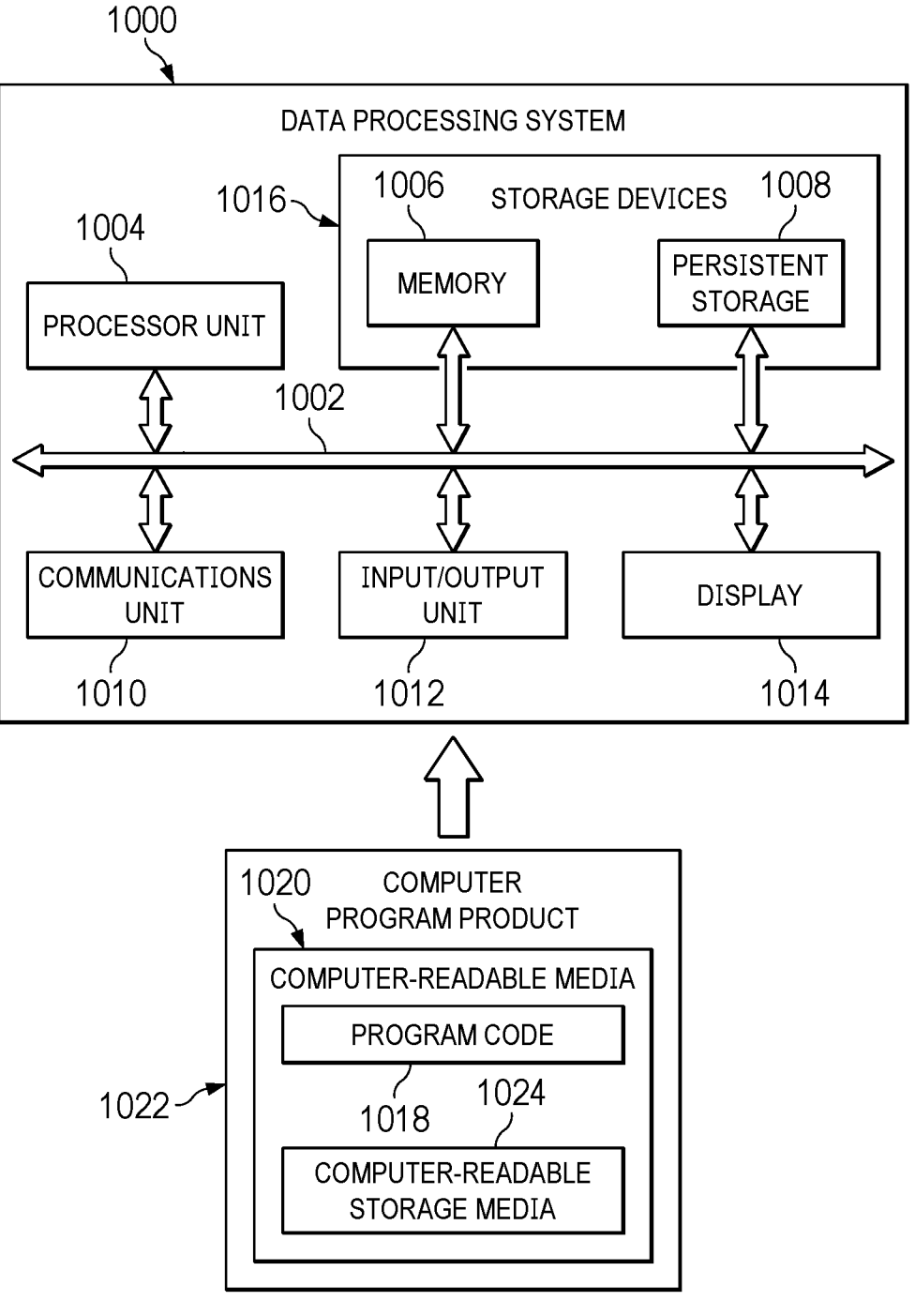
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement computers and computing devices in computing environment 100 in FIG. 1. Data processing system 1000 can also be used to implement computer system 212 in FIG. 2. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program instructions, computer usable program instructions, or computer-readable program instructions that can be read and executed by a processor in processor unit 1004. The program instructions in the different embodiments can be embodied on different physical or computer-readable storage media, such as memory 1006 or persistent storage 1008.

Program instructions 1018 are located in a functional form on computer-readable media 1020 that is selectively removable and can be loaded onto or transferred to data processing system 1000 for execution by processor unit 1004. Program instructions 1018 and computer-readable media 1020 form computer program product 1022 in these illustrative examples. In the illustrative example, computer-readable media 1020 is computer-readable storage media 1024.

Computer-readable storage media 1024 is a physical or tangible storage device used to store program instructions 1018 rather than a medium that propagates or transmits program instructions 1018. Computer-readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1018 can be transferred to data processing system 1000 using a computer-readable signal media. The computer-readable signal media are signals and can be, for example, a propagated data signal containing program instructions 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1020" can be singular or plural. For example, program instructions 1018 can be located in computer-readable media 1020 in the form of a single storage device or system. In another example, program instructions 1018 can be located in computer-readable media 1020 that is distributed in multiple data processing systems. In other words, some instructions in program instructions 1018 can be located in one data processing system while other instructions in program instructions 1018 can be located in one data processing system. For example, a portion of program instructions 1018 can be located in computer-readable media 1020 in a server computer while another portion of program instructions 1018 can be located in computer-readable media 1020 located in a set of client computers.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. In other examples, more than one processor unit can be present. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program instructions 1018.

Thus, illustrative embodiments provide a computer implemented method, computer system, and computer program product for processing vulnerabilities. In one example, a computer implemented method processes vulnerabilities. A processor set identifies a vulnerability and a description of the vulnerability in a vulnerability report. The processor set extracts a set of key exploit conditions for the vulnerability from the description of the vulnerability. The processor set generates a set of different code snippets for the set of key exploit conditions. The processor set searches a set of repositories for a match between the set of components and the set of different code snippets to form a search result. The processor set identifies vulnerability assessment information relating to an applicability of the vulnerability in response to the match between the set of components and the set of different code snippets in the search result.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for processing vulnerabilities, the computer implemented method comprising:
   identifying, by a processor set, a vulnerability and a description of the vulnerability in a vulnerability report;
   extracting, by the processor set, a set of key exploit conditions for the vulnerability from the description of the vulnerability;
   generating, by the processor set, a set of different code snippets for the set of key exploit conditions;
   searching, by the processor set, a set of repositories for a match between a set of components and the set of different code snippets to form a search result; and
   identifying, by the processor set, vulnerability assessment information relating to an applicability of the vulnerability in response to the match between the set of components and the set of different code snippets in the search result;
   searching, by the processor set, a set of sources for the vulnerability assessment information related to the applicability of the vulnerability in response to the search result indicating that the vulnerability has been detected for the set of components in the set of repositories;

generating, by the processor set, a summary of the vulnerability assessment information from the set of sources for reasons for inaction on the vulnerability;

analyzing the summary to identify why the vulnerability is inapplicable for a particular situation; and determining, based on the analyzing, whether any remediation actions are needed with respect to the vulnerability located for the set of components in the set of repositories.

2. The computer implemented method of claim 1 further comprising:

determining, by the processor set, the applicability of the vulnerability based on the search result and the vulnerability assessment information.

3. The computer implemented method of claim 1 further comprising:

identifying, by the processor set, a recommended upgrade for the set of components in response to the match between the set of components and the set of different code snippets in the search result; and determining, by the processor set, whether the recommended upgrade for the set of components will cause a regression issue.

4. The computer implemented method of claim 1, wherein generating, by the processor set, the set of different code snippets comprises:

inputting the set of key exploit conditions, a set of code constructs, and a set of programming languages to a machine learning model system; and receiving the set of different code snippets for the set of key exploit conditions using the set of code constructs in the set of programming languages from the machine learning model system from the machine learning model system.

5. The computer implemented method of claim 1, wherein the set of different code snippets have different code constructs that are different methodologies to invoke components and wherein each code snippet in the set of different code snippets for a particular language is invoked using a language specific construct.

6. The computer implemented method of claim 1, wherein the reasons for inaction on the vulnerability comprise:

an absence of the set of key exploit conditions in the implementation of the set of components; or a determination that the vulnerability is not applicable based on how the set of components are implemented.

7. The computer implemented method of claim 1, further comprising:

generating, by the processor set, a reassessed applicability report for the vulnerability, wherein the reassessed applicability report includes:

an indication as to whether a key exploit condition from the set of key exploit conditions was found in the set of components; and when the key exploit condition is not found, the reasons for inaction on the vulnerability.

8. A computer system comprising:

a processor set;

a set of one or more computer-readable storage media; and program instructions, collectively stored in the set of one or more computer-readable storage media, for causing the processor set to perform computer operations as follows:

identify a vulnerability and a description of the vulnerability in a vulnerability report;

extract a set of key exploit conditions for the vulnerability from the description of the vulnerability;

generate a set of different code snippets for the set of key exploit conditions;

search a set of repositories for a match between a set of components and the set of different code snippets to form a search result; and identify vulnerability assessment information relating to an applicability of the vulnerability in response to the match between the set of components and the set of different code snippets in the search result;

search a set of sources for the vulnerability assessment information related to the applicability of the vulnerability in response to the search result indicating that the vulnerability has been detected for the set of components in the set of repositories;

generate, by the processor set, a summary of the vulnerability assessment information from the set of sources for reasons for inaction on the vulnerability;

analyze the summary to identify why the vulnerability is inapplicable for a particular situation; and determine, based on the analyzing, whether any remediation actions are needed with respect to the vulnerability located for the set of components in the set of repositories.

9. The computer system of claim 8, wherein the program instructions, collectively stored in the set of one or more computer-readable storage media further cause the processor set to:

determine the applicability of the vulnerability based on the search result and the vulnerability assessment information.

10. The computer system of claim 8, wherein the program instructions, collectively stored in the set of one or more computer-readable storage media further cause the processor set to:

identify a recommended upgrade for the set of components in response to the match between the set of components and the set of different code snippets in the search result; and determine whether the recommended upgrade for the set of components will cause a regression issue.

11. The computer system of claim 8, wherein as part of generating the set of different code snippets, the program instructions, collectively stored in the set of one or more computer-readable storage media further cause the processor set to:

input the set of key exploit conditions, a set of code constructs, and a set of programming languages to a machine learning model system; and receive the set of different code snippets for the set of key exploit conditions using the set of code constructs in the set of programming languages from the machine learning model system.

12. The computer system of claim 8, wherein the set of different code snippets have different code constructs that are different methodologies to invoke components and wherein each code snippet in the set of different code snippets for a particular language is invoked using a language specific construct.

13. The computer system of claim 8, wherein the reasons for inaction on the vulnerability comprise:

an absence of the set of key exploit conditions in the implementation of the set of components; or a determination that the vulnerability is not applicable based on how the set of components are implemented.

14. The computer system of claim 8, further comprising:

generating, by the processor set, a vulnerability assessment report identifying a first set of vulnerabilities requiring remediation and a second set of vulnerabilities not requiring remediation, wherein the vulnerability assessment report includes the reasons for inaction for each vulnerability in the second set of vulnerabilities.

15. A computer program product for processing vulnerabilities, the computer program product comprising:

a set of one or more computer-readable storage media;

program instructions, collectively stored in the set of one or more computer-readable storage media, for causing a processor set to perform computer operations as follows:

identify a vulnerability and a description of the vulnerability in a vulnerability report;

extract a set of key exploit conditions for the vulnerability from the description of the vulnerability;

generate a set of different code snippets for the set of key exploit conditions;

search a set of repositories for a match between a set of components and the set of different code snippets to form a search result; and identify vulnerability assessment information relating to an applicability of the vulnerability in response to the match between the set of components and the set of different code snippets in the search result;

search a set of sources for the vulnerability assessment information related to the applicability of the vulnerability in response to the search result indicating that the vulnerability has been detected for the set of components in the set of repositories;

generate a summary of the vulnerability assessment information from a set of sources for reasons for inaction on the vulnerability;

analyze the summary to identify why the vulnerability is inapplicable for a particular situation; and determine, based on the analyzing, whether any remediation actions are needed with respect to the vulnerability located for the set of components in the set of repositories.

16. The computer program product of claim 15, wherein the program instructions, collectively stored in the set of one or more computer-readable storage media further cause the processor set to:

determine the applicability of the vulnerability based on the search result and the vulnerability assessment information.

17. The computer program product of claim 15, wherein the program instructions, collectively stored in the set of one or more computer-readable storage media further cause the processor set to:

identify a recommended upgrade for the set of components in response to the match between the set of components and the set of different code snippets in the search result; and determine whether the recommended upgrade for the set of components will cause a regression issue.

18. The computer program product of claim 15, wherein as part of generating the set of different code snippets, the program instructions, collectively stored in the set of one or more computer-readable storage media further cause the processor set to:

input the set of key exploit conditions, a set of code constructs, and a set of programming languages to a machine learning model system; and receive the set of different code snippets for the set of key exploit conditions using the set of code constructs in the set of programming languages from the machine learning model system.

19. The computer program product of claim 15, wherein the reasons for inaction on the vulnerability comprise:

an absence of the set of key exploit conditions in the implementation of the set of components; or a determination that the vulnerability is not applicable based on how the set of components are implemented.

20. The computer program product of claim 15, further comprising:

generating, by the processor set, a vulnerability assessment report identifying a first set of vulnerabilities requiring remediation and a second set of vulnerabilities not requiring remediation, wherein the vulnerability assessment report includes the reasons for inaction for each vulnerability in the second set of vulnerabilities.

* * * * *